PER JOHAN BERGGREN.
INVENTOR.

FIG. 3.      PER JOHAN BERGGREN.
INVENTOR.
BY Darby & Darby
Att'ys.

Oct. 2, 1951     P. J. BERGGREN     2,569,918
MICROFILM PROJECTOR
Filed Jan. 22, 1946     8 Sheets-Sheet 4

Per Johan Berggren
*INVENTOR.*

BY Darby & Darby

*Attys.*

Oct. 2, 1951 P. J. BERGGREN 2,569,918
MICROFILM PROJECTOR
Filed Jan. 22, 1946 8 Sheets-Sheet 5

Per Johan Berggren.
INVENTOR.

BY Darby & Darby
Att'ys.

PER JOHAN BERGGREN.
INVENTOR.

Oct. 2, 1951  P. J. BERGGREN  2,569,918
MICROFILM PROJECTOR

Filed Jan. 22, 1946  8 Sheets-Sheet 7

PER JOHAN BERGGREN.
INVENTOR.

BY D Darby & Darby.

Att'ys.

Oct. 2, 1951   P. J. BERGGREN   2,569,918
MICROFILM PROJECTOR
Filed Jan. 22, 1946   8 Sheets-Sheet 8

PER JOHAN BERGGREN.
*INVENTOR.*

BY Darby & Darby.
Att'ys.

Patented Oct. 2, 1951

2,569,918

UNITED STATES PATENT OFFICE 2,569,918

MICROFILM PROJECTOR

Per Johan Berggren, Ridgefield, Conn.

Application January 22, 1946, Serial No. 642,732

12 Claims. (Cl. 88—24)

This invention relates to an easily transportable unitary apparatus by means of which microfilm images may be projected for enlarged, close and distant viewing and for reproduction purposes, as for example for projection printing.

The detailed objects of this invention will be more apparent and will be more readily understandable when set forth in connection with the detailed description of the various parts comprising the mechanism, and for that reason will be omitted at this point.

This invention resides substantially in the combination, construction, arrangement and relative location of parts, all as will more clearly appear hereinafter especially in connection with the attached drawings.

In the accompanying drawings.

Figure 19:
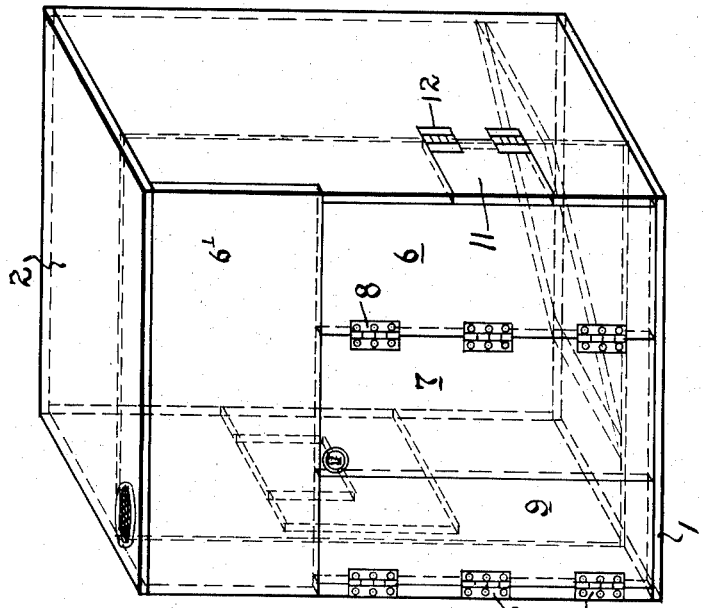
Figures 18 and 19 are perspective views of the portable housing from different sides.
Figure 18:
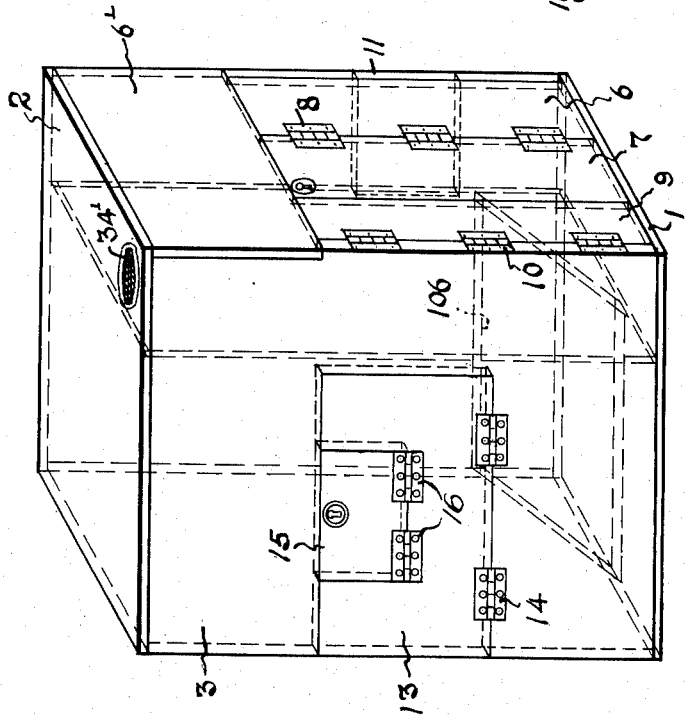

In accordance with one object of this invention the device is designed to be easily transportable and for that purpose a special form of housing has been devised which functionally adapts it to easy manipulation for all the uses to which the device may be put. The construction of this housing is most clearly illustrated in Figures 18 and 19, wherein it will be seen that it is of generally rectangular form and composed of a plain bottom wall 1, top wall 2, and side walls 3 and 4. The side wall 3 is provided with a door 13 hingedly supported on a horizontal pivot axis by means of the hinges 14. Forming a part of the door 13 is a smaller door 15 pivotally connected thereto on a horizontal axis by means of the hinges 16. The side wall 5 is provided, as is clear from Figure 19, with an opening in which is hingedly mounted a small door 11 for pivotal movement on a vertical axis by means of the hinges 12. The remaining wall of the housing is composed of several parts. These include partial side wall sections 6 and 6' which are permanently secured to the other walls. This leaves an opening which is closed by a pair of cooperating doors 7 and 9 which are respectively pivoted on vertical axes by means of the hinges 8 and 10. As will be understood all of these doors may be provided with suitable locking and latching devices.

Figure 1:
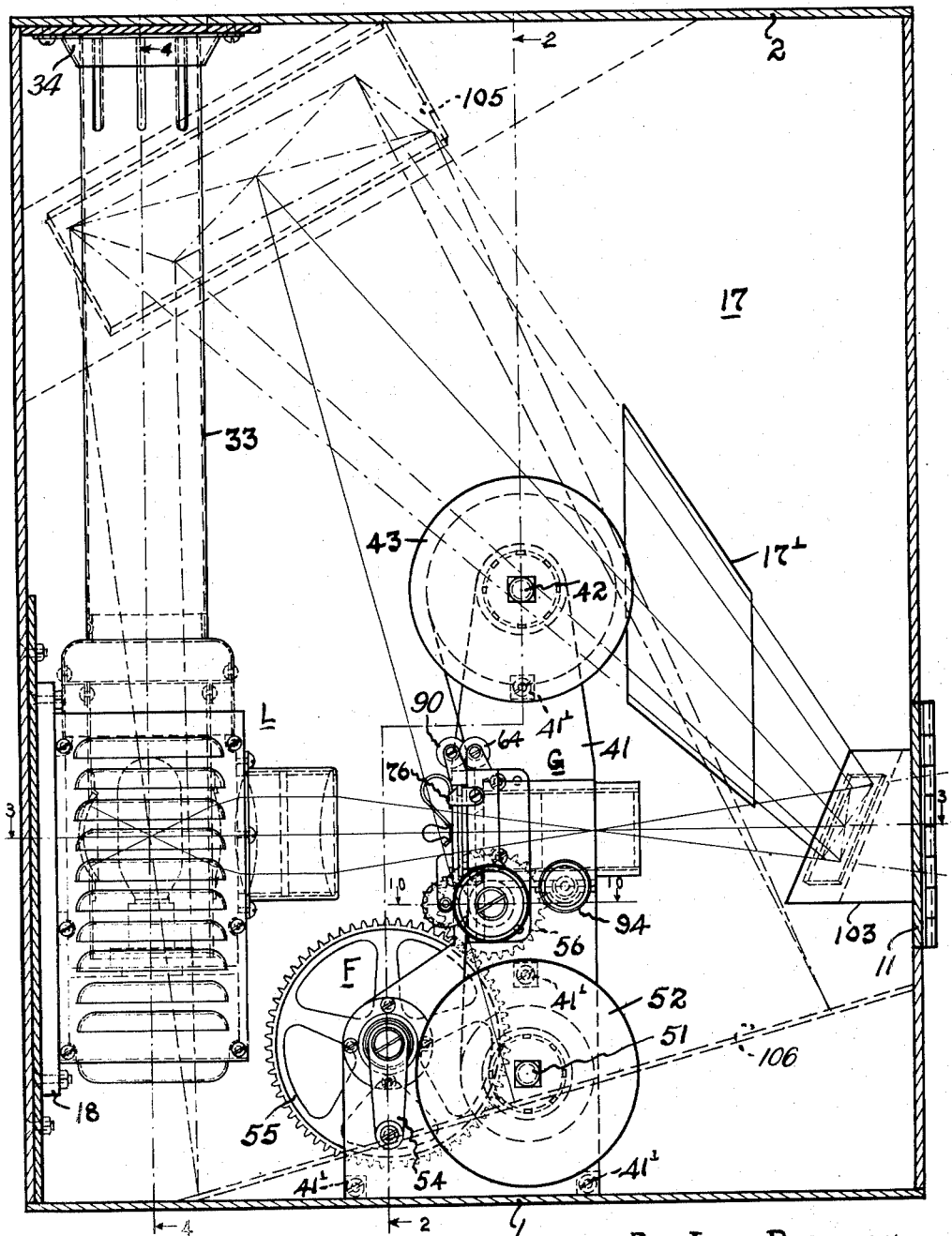
Figure 1 is a side elevational view of the mechanism showing the portable housing in vertical cross-section and diagrammatically illustrating the path of the projected light ray.
Figure 2:
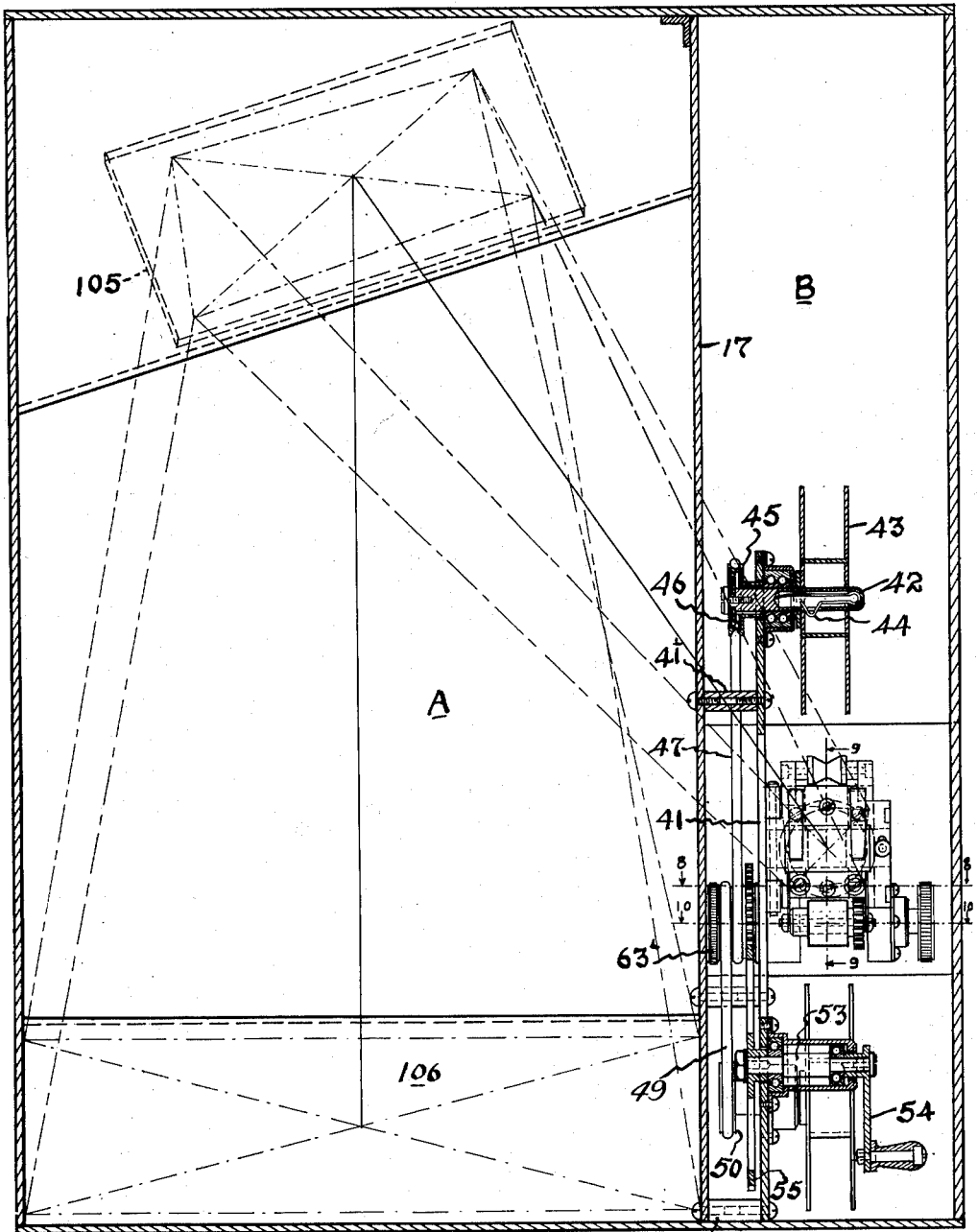
Figure 2 is a vertical cross-sectional view partly in elevation taken on the line 2—2 of Figure 1, similarly illustrating diagrammatically in part the path of the projected light ray.

As appears from several of the views, as for example Figures 1 and 2, the space enclosed by means of these walls is divided into compartments A and B by means of a fixed partition wall 17. The compartment A may be termed the viewing compartment and visual access to the interior thereof is provided through the compound viewing door 13—15. The compartment B houses the mechanism of the machine and is accessible through the doors 7 and 9 for manipulation of the mechanism when in use. Generally the mechanism within the compartment B comprises the lantern housing L (see Fig. 1), the film supporting and feeding mechanism F, and the lens mount and film gate combination G.

Figure 3:
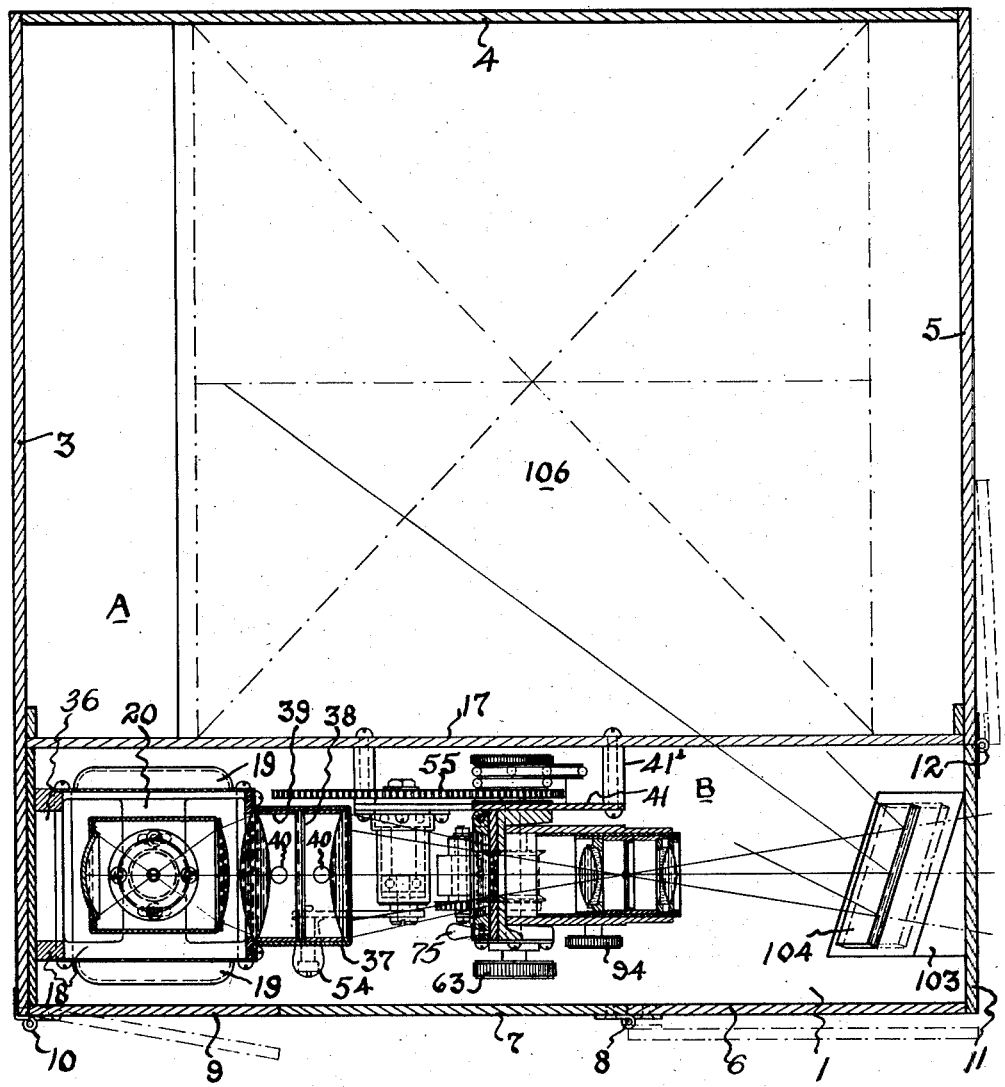
Figure 3 is a horizontal cross-sectional view taken on the line 3—3 of Figure 1.
Figure 4:
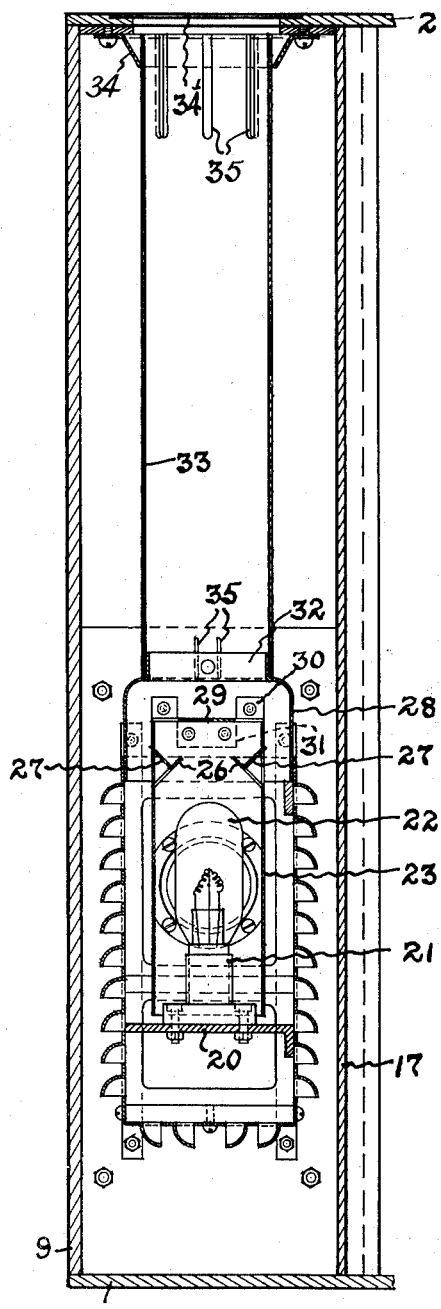
Figure 4 is a vertical, central, cross-sectional view taken on the line 4—4 of Figure 1.

The details of construction of the lamp housing are clearly apparent from Figures 1 and 3 to 6 inclusive. As best shown in Figure 3, the lantern includes a framework casting 18 to which are detachably secured, as by means of screws, a pair of louvered plates 19 mounted on opposite sides of the casting and each providing one-half of a lower bottom wall of the housing. Mounted on a horizontal rib 20 (see Fig. 3) forming part of the casting is the lamp socket 21 in which an electric lamp 22 of any form suitable for the purpose, as a light source for a machine of this type, is mounted.

Figure 5:
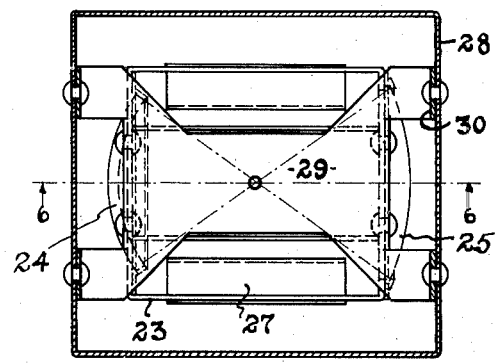
Figure 5 is a horizontal cross-sectional view taken on the line 5—5 of Figure 6.
Figure 6:
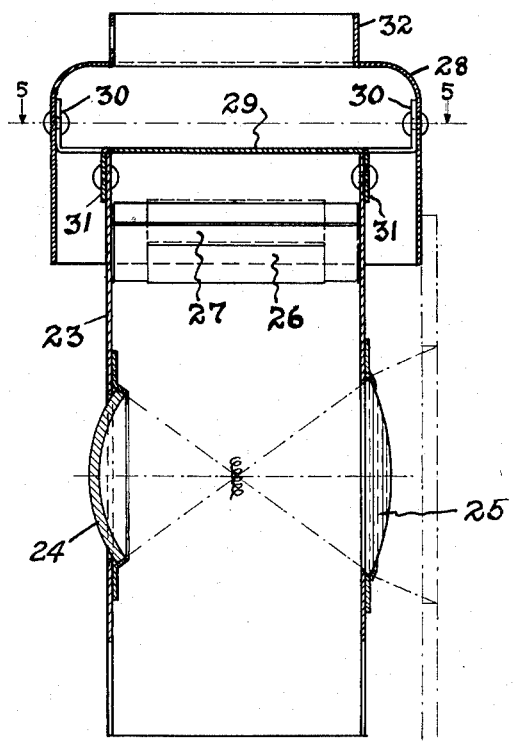
Figure 6 is a vertical, central, cross-sectional view taken on the line 6—6 of Figure 5.
Figure 7:
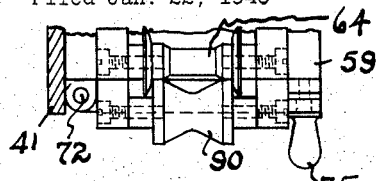
Figure 7 is a top plan detailed view of the gate combination showing the guide rollers and illustrating a portion of the supporting plate in cross section.

This structure includes as a separate removable unit a draft creating chimney structure also serving as a support for a reflector and the first condenser lens. It is best illustrated in Figures 5 and 6. It comprises a rectangular metal tube 23 having supported thereon a spherical reflector 24 and the first condenser lens 25, the relation of which to the filament of the lamp is illustrated in Figure 6. The mirror and the lens are detachably secured to this tube in any suitable manner, as by means of removable collars, as illustrated. A practical feature of this method of mounting the mirror and condenser lens on the draft tube 23 is that they may be relatively fixed with respect to each other and the filament for insuring that the optical axes of these elements shall be and remain in exact relationship.

An opposite pair of walls of the tube 23 are provided with struck-out inwardly projecting flaps 26 which in turn have struck-out outwardly projecting flaps 27 which form vents. At 28 is a hood which is attached to the draft tube 23 by means of a plate 29 which is provided with four integral ears 30 by means of which it is attached to the hood, and another pair of ears 31 by means of which it is attached to the draft tube 23. As will be seen from the various figures, the plate 29 does not close the passage between the draft tube and the hood. Integral with the hood is a circular flange 32 forming a seat for the lower end of the chimney 33 which extends upwardly therefrom to a fixture 34 mounted on the top wall 2 opposite an opening therein which is closed by means of a perforated grill 34. Both ends of the tube are slotted as shown at 35 to facilitate insertion and removal of the chimney thereof.

An important object of this invention, that is of efficient removal and dissipation of the heat from the lamp is attained by this structure. It will be seen from Figure 4 that the draft tube 23 and hood 28 are demountable as a unit and when mounted in the lamp housing by simple telescopic assembly forms with the housing double draft channels in which both faces of the walls of the draft tube are exposed to moving air currents. This tube surrounds the lamp and forms one of the draft channels through which cooling air may directly flow by passage through the louvers in the bottom wall of the lamp housing and upwardly directly around the lamp and from there to the chimney around the plate 29. The air going through the bottom wall louvers flows around the rib 20 which offers little obstruction thereto. The second path of air flow is through the louvers of the side walls of the lamp housing and upwardly around the draft tube 23. The vents formed by the flaps 26—27 permit the cross flow of air currents from the streams inside and outside of the draft tube, while preventing the direct escape of light rays. To further contribute to the dissipation of the heat generated by the light source it will be seen from Figure 3 that the casting is so constructed as to form an air flow channel 36 along the rear wall of the casting. Thus every feature of construction of the lantern is provided with an eye to an effective and rapid dissipation of the heat from the light source and in a manner so that the lantern housing itself where it is exposed to contact by the operator is kept relatively cool.

The structural features of the lantern are such that all of the parts are readily accessible by very easy separation of the parts comprising it.

Detachably mounted on the front wall of the casting 18 is the condenser lens system proper comprising a tube 37 and the usual lenses. A novel feature of the condenser unit proper is the inclusion between the two lenses thereof of the heat absorption disc 38 which is fixed therein in any suitable manner, as for example by means of the spacing sleeves 39. The tube 37 is provided with a series of apertures 40 providing air vents through which air may circulate to cool the lenses and discs. As is well known, the disc 38 is made of glass which has the property of absorbing infra red and some of the red rays, preventing their transmission to the aperture plate. This arrangement of the absorption disc 38 between the lenses of the condenser system at the point where the rays are traveling in parallel relation is a novel combination.

The film feeding mechanism F in light projecting assembly G will now be described. All of the parts thereof are mounted upon a base plate 41 by means of screws and the bases 41' which attach it to the partition wall 17. At the upper end of the base plate 41 is a rotatably mounted spindle 42 on which the film supply reel 43 can be impaled. The spindle is provided with the usual catch 44 for holding the reel in place and on the rear of the spindle is secured a spring belt pulley 45. Incorporated in the pulley is the usual one-way clutch mechanism which causes conjoint rotation of the spindle and pulley in one direction and allows relative rotation in the opposite direction. This pulley is connected by means of a belt 47, in the case illustrated a spring belt, which extends to a double pulley 48 (see Fig. 10) which is attached to a shaft 49 for rotation therewith. This double pulley is connected by a belt 49 to a pulley 50 connected to the lower reel spindle 51 likewise suitably journaled in the base plate 41 and provided with the usual spring catch by means of which the take-up reel 52 may be detachably secured thereto (see Fig. 1).

At 53 is a shaft journaled in suitable bearings on the base plate 41 on the outer end of which shaft is attached a crank 54 and on the other end in back of the base plate is attached a gear 55 (see Figs. 1 and 2). The gear 55 meshes with a pinion 56 which is pinned to the double pulley 48 which, as previously stated, is fixed to the shaft 49. Shaft 49 is journaled in a bearing 57 at one end and in a bearing 58 at the other end mounted in the aperture plate casting 59. Secured to the shaft 49 is a pulley 60 provided with a friction facing in the form of a sleeve of rubber, for example, which parts together form the main feed roll. On the outer end of the shaft 49 is a knurled operating knob 63. In order to avoid confusion it may be noted that the double pulley 48 is provided with a knurled handle portion 63' which in the particular arrangement of apparatus illustrated serves no particular function, although it is provided for manual rotation of shaft 49 from that end.

Figure 8:
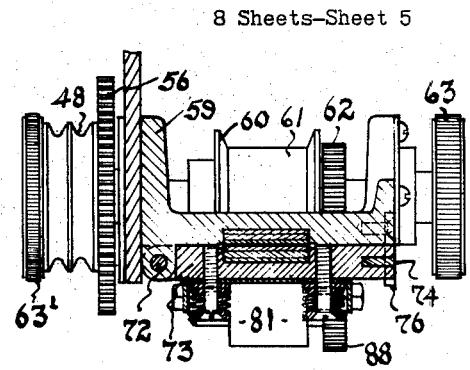
Figure 8 is a horizontal cross-sectional view taken on the line 8—8 of Figure 2, showing the structure at the aperture.
Figure 9:
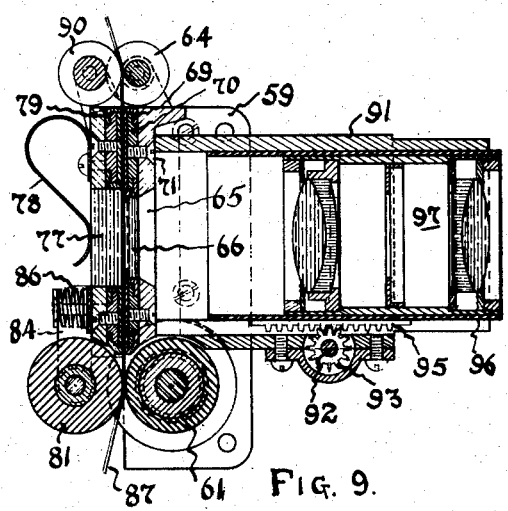
Figure 9 is a vertical, central, cross-sectional view taken on the line 9—9 of Figure 2, showing the gate combination, the projecting lens system and the focusing mechanism.
Figure 13:
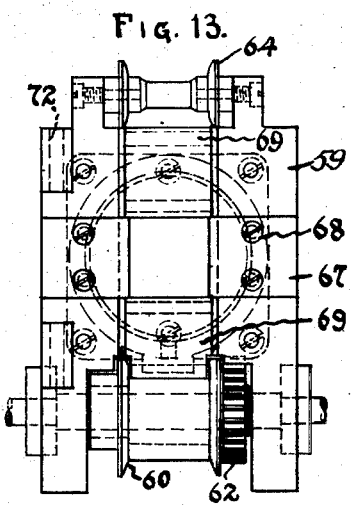
Figure 13 is a front elevational view of the aperture plate showing its relation to the rear guide roller and film feeding roll.

The aperture plate casting 59 appears in elevation in Figure 13 and in cross-section in Figures 8 and 9. Rotatably mounted on the upper edge of the casting 59 is a guide roller 64. As appears in Figure 9 the aperture plate casting 59 is provided with an aperture 65 in which a glass plate 66 is secured by means of a pair of plates 67, the vertical edges of which are beveled to mate with the similarly beveled edges of the glass plate 66. The plates 67 are detachably secured to the casting by means of screws 68, as shown in Figure 13. The face of the casting underlying the metal plates 67 is recessed so that these plates lie in the plane of the face of the casting. The face of the casting 59 is also provided with vertically extending recesses in which the wiper pads 69 which lie above and below the aperture are mounted. These pads are attached in place by overlapping the upper and lower ends thereof with a rabbeted plate 70 (see Fig. 9) which plates are secured to the casting 59 from the rear by means of the screws 71. The faces of these pads lie slightly above the plane of the face of the casting.

Pivotally mounted on the casting 59 on the hinge pins 72 is the pressure plate gate 73. In the edge of the gate is a vertically slidable catch 74 operable by the button 75 (see Fig. 15) for cooperation with the pair of latch plates 76 secured to the casting 59. The gate 73 has an aperture in which a transparent pressure plate 77 may move under the influence of the flat springs 78 secured to the outer face of the gate. The glass pressure plate 77 has beveled side edges (see Fig. 15) for cooperation with the beveled side edges of the aperture in the gate so that the springs may not push it all the way through the opening.

Figure 10:
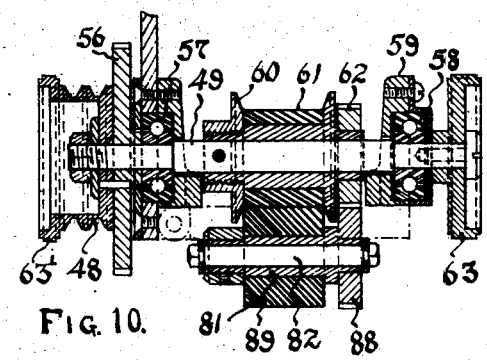
Figure 10 is a horizontal, cross-sectional view taken on the line 10—10 of Figure 2 showing the film feeding mechanism.

Secured on the inner face of the gate is another pair of cleaning pads 79 aligned with the pair on the main casting. The cleaning pads 79 are secured to the gate in the same way as the previously described pair as clearly illustrated in Figure 9. Mounted on the outer face of the gate at the bottom edge is a floating spring loaded support for the cooperating feed roll 81, which is preferably of some high friction material such as rubber. The roller 81 is mounted on a shaft 82 journaled in a plate 83 having downwardly extending parallel arms 84 which receive the shaft. The plate 83 is mounted upon a pair of pins 85 secured to the gate and between which are interposed the coil springs 86. As is clear from Figure 9, when the gate is closed the feed roll 81 presses the film 87 against the cooperating feed roll 61 previously described. As illustrated in Figure 10, instead of making the shaft 82 rotatable in the downwardly extending arms 84 of the plate 83, and thus requiring a bearing at this point, the shaft 82 is locked in these arms and the roller 81 and gear 88 are mounted on a sleeve 89 which rotates on the shaft 82.

A feature of this construction is that the friction rolls 61 and 81 are geared together by means of the gears 82 and 83 which mesh loosely enough so that the loading provided at the springs 86 can control the frictional drive while insuring conjoint rotation of the rolls without relative slipping on the film, thereby preventing abrasion.

Figures 11, 12:
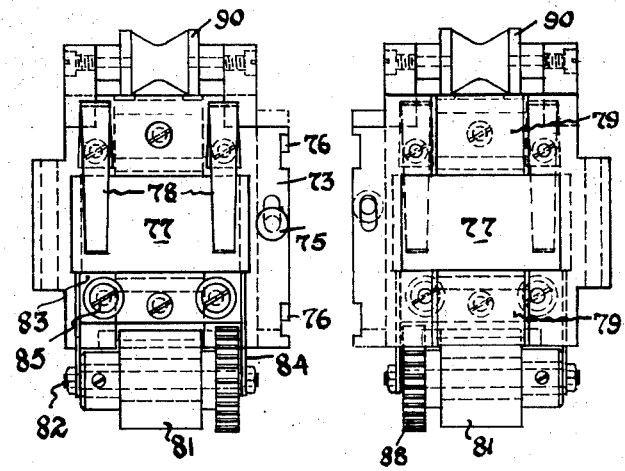
Figure 11 is a front elevational view of the gate showing its relationship to the front guide rollers and the front reel of the film feeding mechanism, and illustrating the pressure plate.
Figure 12 is a rear elevational view of the same elements.

Secured to a pair of upstanding integral ears on the gate 73 is the front gate roller 90. It is to be noted that the rear gate roller 64 and the roll 60 having the friction surface 61 are flanged at the ends, as is clear from Figures 10 and 12, and that the front friction roll 81 and the front guide roll 90 are proportioned so as to lie within the flanges so as to press the film 87 directly against the friction surface 61 and the friction roll 81. This greatly facilitates threading of the machine and movement of the film into proper transverse relation with respect to the aperture and into correct contact with the guide and friction rolls, without any special effort to manually line up the film with these elements.

Another feature of this construction is found in the arrangement described wherein the film is contacted above and below the aperture by means of the wiping pads which are preferably made of velvet or some other suitable material. As is clear from Figure 9, the film is actually engaged on opposite sides by means of the aperture glass plate 66 and the glass pressure plate 77 which presses the film therebetween under the pressure generated by the light flat springs 78. This insures that the film at the region of projection lies accurately in the focal plane and will remain therein during projection.

To thread the machine the gate 73 is unlatched by raising the finger piece 75 which disengages the latch bar 74 from the latch fingers 76 and the gate is then swung open on the hinge pins 72. A supply reel 43 is slipped and latched onto the spindle 42 and the end of the film is run down past the aperture in alignment with the guide roll 64 and the friction roll 60, and the end is attached to take-up reel 52 which has been mounted and latched on the lower spindle 51. The gate 73 then need only be closed and snapped into position with the assurance that the front upper guide roll 90 and lower friction drive roll 81 will guide the film to seating relation with the cooperating rolls. The film can then be rapidly moved manually in the direction of its length in the region of the aperture by rotating the handle 54 which conjointly causes rotation of spindle 51 and shaft 49. Spindle 51 is rotated by the gears 55 and 56 and spindle 51 is driven from shaft 49 by means of the inner groove pulley of the double pulley 48 and the belt 49 (see Fig. 2). Spindle 42 does not rotate at this time because the built in one-way clutch 46 does not act in this direction, that is the direction of feeding the film from the supply reel 43 to take-up reel 52. This provides a fast acting feed to move the film to that portion of the length to be viewed. In the event that it is desired to quickly move the film in the opposite direction, that is from the take-up reel to the supply reel, the crank 54 is rotated in the opposite direction, causing rotation of shaft 49 in the opposite direction, and in this case driving the spindle 42 through the belt 49 and the one-way clutch 46 which acts in that direction. A similar one-way acting clutch built into spindle 51 does not cause reverse driving of this spindle. Thus the spindles 42 and 51 are each driven in one direction, which directions are opposite to each other and are not driven in the other direction. When the film has been moved to the approximate desired position it can then be more slowly rotated by means of the knurled knob 63, in which event the film is frictionally driven by means of the cooperating friction rolls 61 and 81, and in view of the double pulley connection at 48 to the spindles 42 and 51 they will be properly driven and idle, as previously explained, for either direction of movement of the film.

Figure 15:
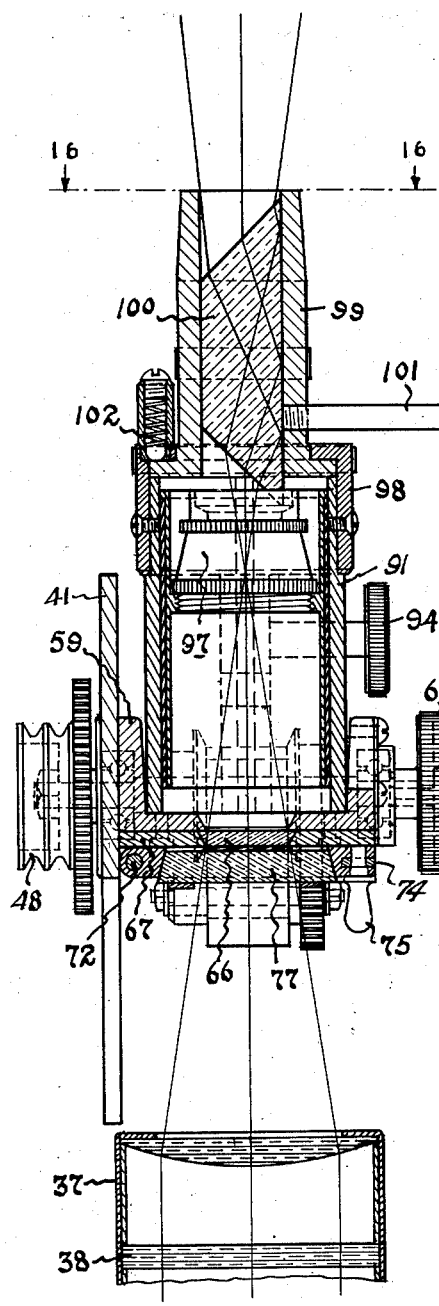
Figure 15 is a horizontal, central, cross-sectional view through the lens mount and image turning mechanism as taken on the line 15—15 of Figure 16.
Figure 16:
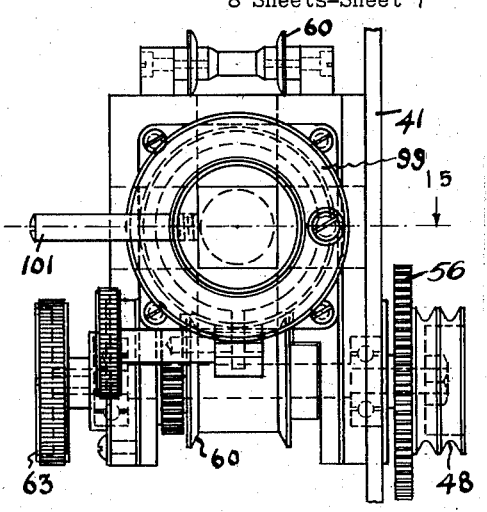
Figure 16 is an end elevational view from the plane 16—16 of Figure 15.
Figure 17:
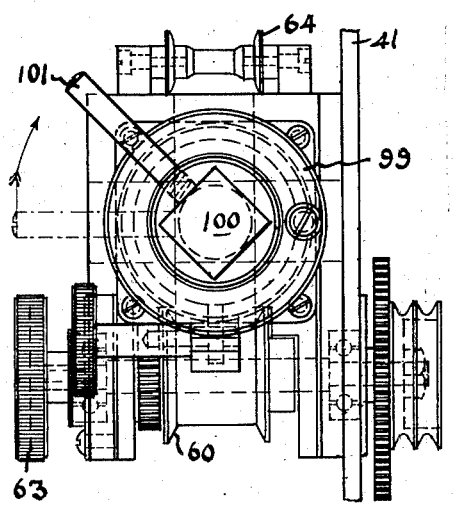
Figure 17 is a similar view showing the mechanism in an adjusted or different position from that shown in Figure 16.

Referring now to Figures 9 and 15, a description of the projection lens system and image rotating structure will be given. Attached to the rear face of the casting 59 in any suitable manner is a fixed sleeve 91, in the bottom of which is journaled a shaft 92 on which is mounted in a suitable housing a pinion 93 and on the outer end of which is attached a knurled knob 94. The pinion 93 cooperates with a toothed rack 95 secured to a longitudinally slidable lens mount tubing 96. Mounted in the lens mount tube is any suitable form of projection lens system 97. As those skilled in the art will understand manipulation of the knurled knob 94 will cause focusing movement of the lens mount 2.

The outer end of the sleeve 91 has an annular recess on which a cup shaped member 98 is secured to form a seat with the end of the sleeve 91 for a flanged sleeve 99 in which is mounted a Dove prism 100. The flanged sleeve 99 is provided with an operating pin 101 and a spring pressed ball detent 102 cooperates with the flange of the sleeve 99 to impose a drag on the rotation of the sleeve so that it will stay in any adjusted position.

In the partition wall 17 is an opening 17'. Mounted on the inner face of the door 11 is a support 103 upon which is mounted a mirror 104 (see Fig. 3). This mirror is positioned to receive the image from the projection system and reflect it through the opening 17', onto a mirror 105 supported at the proper angle in the compartment A above the window provided by the door 13 (see Fig. 1). From there the image is reflected onto a suitable viewing image plate 106, which may be of any suitable material preferably a metal plate having a mat surface. For example it could be a metal plate with a screen paint, preferably of cream color.

Figure 14:
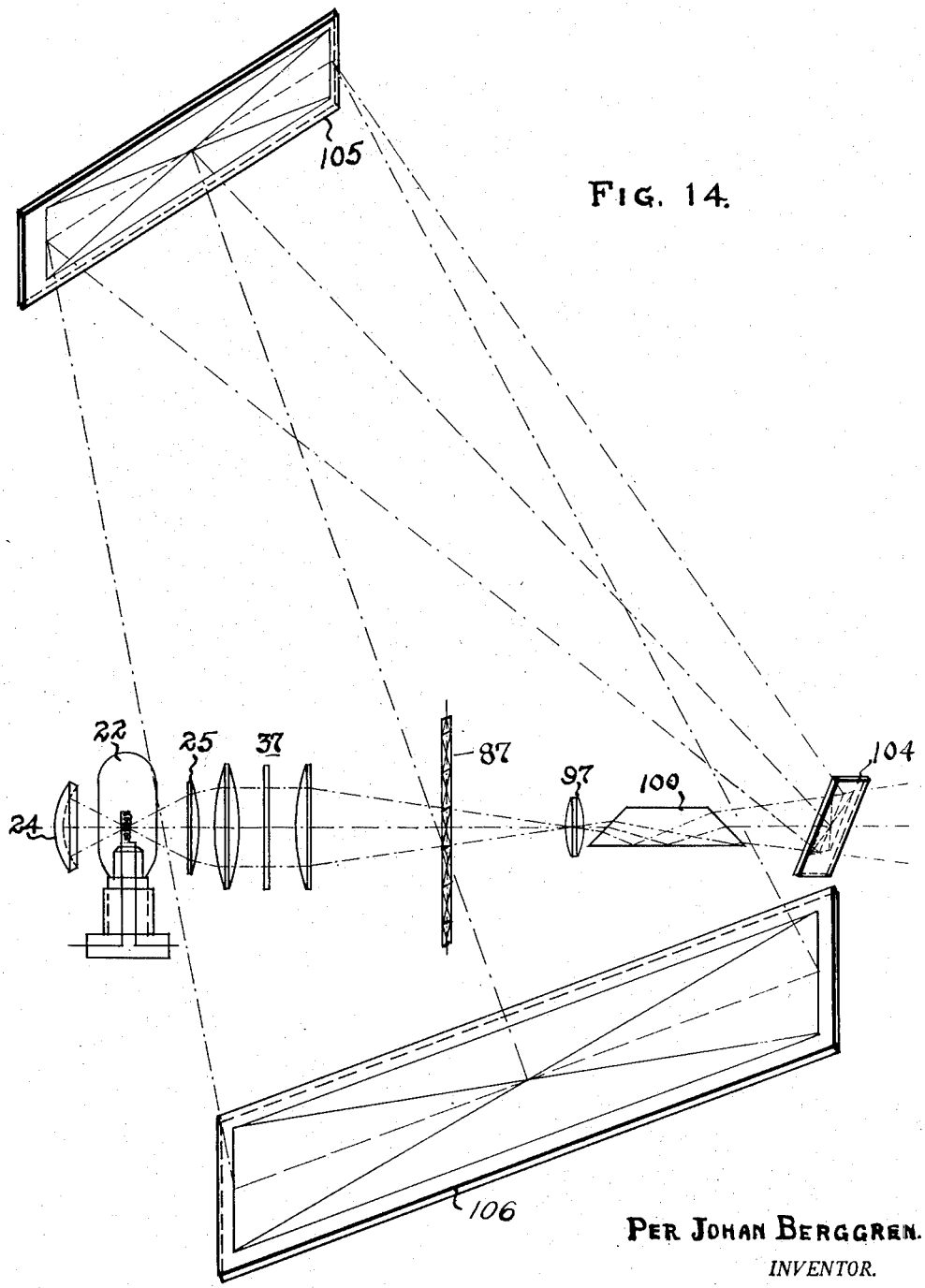
Figure 14 is a schematic and diagrammatic illustration of the optical system of the projector.

To better visualize the relationship of the entire optical and reflecting system reference may be made to Figure 14 where there is diagrammatically and schematically illustrated the relative arrangement of the various parts.

In view of the fact that due to lack of care in preparing the microfilm, or in cases where conservation of space on the film dictates that the original document be photographed, it becomes highly desirable to be able to rotate the image on the display surface 106 so as to be in proper reading position. In order to accomplish this the operator rotates the prism 100 which is accomplished by rotating the sleeve 99 by means of the pin or handle 101. As those skilled in optics will understand, this will cause the image to rotate so that it can be adjusted to proper reading position on the viewing screen.

In order to adapt this same mechanism to projection of the images either for purposes of greater enlargement or for viewing by a larger number of persons, it will be noted that the mirror 104 has been mounted on the door 11. By opening the door to the dotted position shown in Figure 3 it will be seen that the projected image can pass through the opening in the housing normally closed by this door for projecting it to any suitable viewing surface.

The compound door arrangement 13—15 is provided so that when the device is used under conditions of relatively high ambient illumination the larger door 13 can be closed and the smaller door 15 opened so that the viewing surface 106 is more effectively screened from disturbing outside light. When the machine is used for projection printing the larger door facilitates introduction and removal of a full sized sensitized paper.

The provision of the double doors 7 and 9 and the relative location of all these parts of the mechanism require manual manipulation such that by opening these doors all of the mechanism is readily accessible. In addition this mechanism is readily accessible to the person who is using the machine and while he is viewing the projected images. An operator quickly learns the location of all the manual controls so that while viewing the projected images he can manipulate the machine to meet all of his wishes. Finally, the entire mechanism is so housed that it is easily portable and it is protected from damage while in transit.

From the above description it will be apparent to those skilled in the art that the subject matter of this invention is capable of embodiment in many modified physical forms, and I do not, therefore desire to be strictly limited to the particular physical embodiment shown in the drawings for purposes of illustration of the invention, but only as required by the claims granted me.

What is claimed is:

1. The combination of a microfilm projector and viewer comprising a viewing box completely enclosing a lantern, a projection unit, reflection means and an opaque viewing screen fixed in said box; said lantern comprising a source of light, an envelope for said source of light, said envelope comprising self-contained heat dispersion means; condensing means for concentrating light from said source, said condensing means comprising self-contained heat filtering means; said projection unit comprising film guide means and film drive means mounted thereon for guiding film images through the path of said concentrated light, means for focusing the light passing through said film images for projection onto a viewing screen, and means for rotating the projected image about the center of said image, said viewing box having an opening through which said viewing screen is visible and another opening through which the image may be projected onto a viewing surface, a door for normally closing said last opening, a portion of said reflecting means being mounted on said door so as to be in use when said door is closed.

2. The apparatus according to claim 1, including in combination a duplex door for said opening whereby different size openings are provided.

3. A lantern housing for a projector comprising a framework having front and back members integrally united in spaced relation, and a pair of detachable louvered side walls having louvered extensions forming a bottom wall, an apertured tube in said housing, a removable draft tube having an apertured hood for closing the top of the lantern housing, said tube being spaced from the walls of said housing and having a reflector and a condensing lens permanently fixed thereon in diametrically aligned position.

4. A lantern construction for a projector comprising an outer housing composed of a frame made up of a back member and a front wall united in spaced relation, removable louvered side wall plates extending between said back member and front wall and having right angled extensions to form a bottom wall for the housing, a removable closure on the top of said housing, a dependent tube extending into said housing and spaced from the walls thereof whereby air may enter the housing and travel upwardly interiorly and exteriorly of said tube and a reflector and lens fixedly mounted on said tube in axial alignment.

5. A lantern structure for a projector comprising an integral framework including a supporting member, a front wall spaced therefrom and a spider connecting said member and wall at the bottom, a pair of louvered side walls attached to said framework and extending below said spider, said side walls having right angled louvered extensions forming a bottom wall, all of said elements forming an outer housing, and said spider providing a support for a light source, an apertured tube within said housing to form an enclosure for the light source and having a free space therearound between it and the housing, and a closure for said housing providing a support for said tube and holding it in spaced relation within said housing.

6. In the combination of claim 5, said tube having a pair of diametrically aligned openings and a reflector and a lens fixed in said openings.

7. In a film feeding and positioning mechanism, the combination including means for supporting a pair of film reels in spaced relation, an aperture plate mounted between said film supporting means, a film gate pivotally mounted on said aperture plate, a pair of cooperating guide rollers having flanges axially spaced to engage the side edges of the film and the other roller fitting closely between said flanges, a pair of similar guide rollers supported on said plate and gate to receive the film therefrom, said second pair of guide rollers providing frictional engagement with the film, and means for positively driving said second pair of guide rollers, both of said pairs of rollers transversely aligning the film with the apertures in said plate and gate.

8. In the combination of claim 7, said second pair of guide rollers being geared together.

9. In the combination of claim 7, the flanges of the flanged guide rollers of each pair being tapered so that the inner faces of the flanges converge towards the axis of the associated roller.

10. In the combination of claim 7, the guide roller of the second pair being resiliently mounted on the gate.

11. In the combination of claim 7, the aperture in said plate containing a fixed light transmitting window, the aperture in the gate containing a movable light transmitting member, spring means for lightly pressing said second light transmitting member towards said first light transmitting member, and film cleaning means comprising pairs of cleaning pads detachably secured to said plate and gate at the top and the bottom of the plate aperture.

12. In the combination of claim 7, additional means for driving said second pair of rollers at a relatively greater speed than that effected by said first driving means.

PER JOHAN BERGGREN.

REFERENCES CITED

The following references are of record in the file of this patent:

UNITED STATES PATENTS

| Number | Name | Date |
|---|---|---|
| 1,160,764 | Robinson et al. | Nov. 16, 1915 |
| 1,287,502 | Stechbart | Dec. 10, 1918 |
| 1,427,575 | Brenkert et al. | Aug. 29, 1922 |
| 1,581,198 | Gramsa | Apr. 20, 1926 |
| 1,671,449 | Readeker | May 29, 1928 |
| 1,824,519 | Victor | Sept. 22, 1931 |
| 1,964,712 | Bauersfeld | July 3, 1934 |
| 2,008,982 | Hopkins | July 23, 1935 |
| 2,022,903 | Thomas | Dec. 3, 1935 |
| 2,064,368 | Bausch et al. | Dec. 15, 1936 |
| 2,160,847 | Eitzen | June 6, 1939 |
| 2,160,848 | Eitzen | June 6, 1939 |
| 2,174,660 | Hirsch | Oct. 3, 1939 |
| 2,174,778 | Croft | Oct. 3, 1939 |
| 2,242,464 | Githens et al. | May 20, 1941 |
| 2,292,966 | Osterberg et al. | Aug. 11, 1942 |
| 2,322,023 | Hopkins | June 15, 1943 |
| 2,323,372 | Bryce | July 6, 1943 |
| 2,351,371 | Smith | June 13, 1944 |
| 2,377,476 | Berglund | June 5, 1945 |